(12) United States Patent
Galoso et al.

(10) Patent No.: US 11,243,785 B2
(45) Date of Patent: Feb. 8, 2022

(54) USER INTERFACE INTERACTION OPTIMIZATION SYSTEM AND METHOD TO DETECT AND DISPLAY A CORRELATION BETWEEN A USER INTERFACE VARIATION AND A USER INTERACTION GOAL

(71) Applicants: Atlassian Pty Ltd., Sydney (AU); Atlassian Inc., San Francisco, CA (US)

(72) Inventors: Fredrick Galoso, Muscatine, IA (US); Nathan Selvidge, Brooklyn, NY (US); Ryan Sorensen, North Hollywood, CA (US)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

(21) Appl. No.: 16/440,642

(22) Filed: Jun. 13, 2019

(65) Prior Publication Data
US 2020/0394054 A1 Dec. 17, 2020

(51) Int. Cl.
*G06F 9/451* (2018.01)
*G06F 16/903* (2019.01)
*G06F 3/0482* (2013.01)
*G06F 17/18* (2006.01)

(52) U.S. Cl.
CPC ............ *G06F 9/451* (2018.02); *G06F 3/0482* (2013.01); *G06F 16/903* (2019.01); *G06F 17/18* (2013.01)

(58) Field of Classification Search
CPC ...... G06F 9/451; G06F 16/903; G06F 3/0482; G06F 17/18

USPC ......................................................... 715/765
See application file for complete search history.

(56) References Cited

U.S. PATENT DOCUMENTS

| | | | | |
|---|---|---|---|---|
| 5,616,504 | A | * | 4/1997 | Brown .................... G01N 33/48 436/518 |
| 10,070,122 | B2 | * | 9/2018 | Hoofien ............... H04N 21/251 |
| 2009/0030859 | A1 | * | 1/2009 | Buchs ................... G06F 16/957 706/19 |

(Continued)

OTHER PUBLICATIONS

Wang et al., "Probabilistic Models for Ad Viewability Prediction on the Web", IEEE Transactions on Knowledge and Data Engineering, vol. 29, No. 9, Sep. 2017, pp. 2012-2025. (Year: 2017).*

*Primary Examiner* — Reza Nabi
*Assistant Examiner* — Hwei-Min Lu
(74) *Attorney, Agent, or Firm* — Brownstein Hyatt Farber Schreck, LLP (57) ABSTRACT

A systems for optimizing a user interface includes a host service/device coupled to two databases. One database stores historical information of user interaction(s) with the interface and the another stores predefined query strings that when submitted to the first database obtain statistically testable datasets. As a result of this construction, a user of the optimization system is able to submit a request to the host service/device that includes (1) a selected user interface variation and (2) a selected user interaction goal. In response, the optimization system accesses the second database to retrieve a set of queries related to the variation and a set of queries related to the goal. Thereafter, the query sets can be submitted to the first database to obtain two testable datasets (e.g., a control set and a variant set) for automatic statistical analysis.

18 Claims, 5 Drawing Sheets

(56) References Cited

U.S. PATENT DOCUMENTS

| | | | | |
|---|---|---|---|---|
| 2009/0037880 A1* | 2/2009 | Adger, III | ............ | G06Q 90/00 |
| | | | | 717/121 |
| 2010/0100419 A1* | 4/2010 | Natoli | ................ | G06Q 30/02 |
| | | | | 705/7.31 |
| 2011/0196733 A1* | 8/2011 | Li | ...................... | G06Q 30/02 |
| | | | | 705/14.42 |
| 2013/0218818 A1* | 8/2013 | Phillips | ............... | G06N 20/00 |
| | | | | 706/12 |
| 2014/0075336 A1* | 3/2014 | Curtis | ................ | G06F 3/0481 |
| | | | | 715/753 |
| 2014/0172871 A1* | 6/2014 | Brayman | ........... | G06F 16/2272 |
| | | | | 707/741 |
| 2014/0322677 A1* | 10/2014 | Segal | ...................... | G09B 5/02 |
| | | | | 434/107 |
| 2014/0337779 A1* | 11/2014 | Davis | .................. | G06F 3/0484 |
| | | | | 715/771 |
| 2015/0066597 A1* | 3/2015 | Givoni | ............. | G06Q 30/0277 |
| | | | | 705/7.36 |
| 2015/0095756 A1* | 4/2015 | Aganovic | ............ | G06F 40/103 |
| | | | | 715/234 |
| 2016/0349969 A1* | 12/2016 | Tallamy | ................ | G06F 9/451 |
| 2018/0060469 A1* | 3/2018 | Morgan | ............... | G06F 30/20 |
| 2018/0268307 A1* | 9/2018 | Kobayashi | ............ | G06N 7/005 |
| 2019/0311301 A1* | 10/2019 | Pyati | .................... | G06F 16/901 |

\* cited by examiner

USER INTERFACE INTERACTION OPTIMIZATION SYSTEM AND METHOD TO DETECT AND DISPLAY A CORRELATION BETWEEN A USER INTERFACE VARIATION AND A USER INTERACTION GOAL

TECHNICAL FIELD

Embodiments described herein relate to systems and methods for optimizing user interfaces and, in particular, to systems and methods for organizing and displaying inferences and/or other evidence that a user interface variation is associated with a user interaction goal. Embodiments described herein also relate to systems and methods for detecting a positive, negative, or neutral correlation between a user interface variation and a change in a user interaction goal.

BACKGROUND

A user interface designer, such as a designer of a collaborative work tool accessible by many individuals to facilitate and coordinate completion of work related to a project, can leverage A/B testing to infer whether a proposed modification to a user interface would help accomplish a given user interaction goal. For example, a collaborative work tool interface designer may conduct an A/B test to determine whether increasing a font size of a button (i.e., a proposed change) shown in specific section of the collaborative work tool interface is associated with an increase in the number of users of that click the button (i.e., a user interaction goal).

Conventional A/B testing used by user interface designers is a frequentist analysis performed by presenting different groups of users with different user interfaces, and tallying which group(s) accomplish a user interaction goal more frequently. Once a sufficient quantity of data is collected for all groups, a p-test can be conducted to determine whether the null hypothesis (i.e., that the user interface modification under test has no influence on the selected user interaction goal) can be rejected with confidence. However, p-test results are often confused with a statistical confidence in the effect of a proposed user interface modification, which can result in design decisions that do not substantively contribute to improvements in user interaction. The systems and techniques described herein may be used to evaluate variations in a user interface without some of the drawbacks of some traditional evaluation techniques.

SUMMARY

Embodiments described herein relate to methods for determining and displaying a probability that a relationship between (1) a selected user interface variation and (2) a selected user interaction goal exists.

These described methods display the determined probability(s) in a graphical user interface to present to a user of that graphical user interface a visual indication of whether the selected user interface variation is associated with a positive, negative, or neutral effect on the selected user interaction goal.

A method described herein includes the operation of receiving an instruction that includes two (or more) data items. A first data item of the instruction corresponds to a selected user interaction goal and a second data item corresponds to a selected user interface variation. Thereafter, the method obtains a control dataset from a database communicably coupled to the host service. The control dataset includes only user interface interaction data that is not associated with the selected user interface variation. The method additionally obtains a variant dataset from the same database. The variant dataset includes only user interface interaction data that is associated with the selected user interface variation. Thereafter, the method determines a control posterior distribution from the control dataset and a variant posterior distribution from the variant dataset. With these distributions, a probability that the selected user interaction goal is more likely to be achieved under the variant posterior distribution than the control posterior distribution can be determined. In response to this determination, a signal can be provided to a client device to cause a graphical user interface of that device to display the determined probability.

Some embodiments may include further include the operation(s) of: displaying a number of selectable user interaction goals and a number of selectable user interface variations. A user interface variation can be selected from the number of selectable user interface variations and a user interaction goal can be selected from the number of selectable user interaction goals. These selections can be used to generate the instruction referenced above. Some embodiments include a configuration in which each of the selectable user interface variations correspond to a respective one previously-conducted A/B test.

Some embodiments include a configuration in which the database referenced above is a first database. In these examples, the method further includes the operation of accessing a second database to obtain a base set of query strings. The second database can be queried by submitting the first data item (e.g., corresponding to a selected user interaction goal) to the second database. In response, the method can advance by generating a control set of query strings by (1) modifying each query string of the base set of query strings to only match data not associated with the selected user interface variation and (2) submitting each query string of the control set of query strings to the first database. Similarly, the method can generate a variant set of query strings by (1) modifying each query string of the base set of query strings to only match data associated with the selected user interface variation and (2) submitting each query string of the variant set of query strings to the first database. In other embodiments, the query strings of the base set may not be modified; instead, results from a query (or more than one query) of the second database may be filtered match or not match data associated with the selected user interface variation.

Further embodiments include selecting a prior distribution type based on the selected user interaction goal. In these examples, the control posterior distribution may be based on the selected prior distribution type and the control dataset, the variant posterior distribution may be based on the selected prior distribution type and the variant dataset.

Related embodiments include a configuration in which the operation of determining the probability that the selected user interaction goal is more likely to be achieved under the variant posterior distribution than the control posterior distribution includes a Monte Carlo integration operation for each of the control posterior distribution and the variant posterior distribution.

Further embodiments described herein relate to a method for conducting interaction analysis of a first graphical user interface presented by a client device communicably coupled to a host device. This described method includes the operations of: receiving a goal identifier corresponding to a selected goal for user interaction with the first graphical user interface; receiving an experiment identifier corresponding to a selected variation of the first graphical user interface (optionally, the selected variation associated with a previously-conducted interface variation experiment); obtaining a dataset constructor query by submitting the goal identifier and the experiment identifier to a query string database; obtaining a control dataset by querying a user interaction history database with the dataset constructor query, the control dataset filtered to comprise only interaction data of users not presented the selected variation; obtaining an experiment dataset by querying the user interaction history database with the dataset constructor query, the experiment dataset filtered to comprise only interaction data of users presented the selected variation; extracting control dataset metadata from the control dataset, the control dataset metadata comprising a control percentage of users not presented the selected variation that achieved the selected goal; determining an experiment posterior distribution from the experiment dataset; extracting experiment metadata from the experiment posterior distribution, the experiment metadata with a high density interval based on a predefined uncertainty threshold; and displaying, at a second graphical user interface, the high density interval juxtaposing the control percentage (e.g., substantially adjacent or otherwise visually close together).

Some embodiments can include the operation of determining whether a first portion of the high density interval that is greater than (partially or entirely) the control percentage. In addition, certain methods further determine whether a second portion of the high density interval that is less than (partially or entirely) the control percentage. Thereafter, at the second graphical user interface, at least one of the first or second portions of the high density interval can be displayed. In some cases, the first and second portions can be displayed as a single range.

Some embodiments further include an operation of determining whether the first or second portion of the high density interval are equal to zero. In these examples, upon determining that the second portion of the high density interval is equal to zero (e.g., the entire high density interval is greater than the control percentage), the method can advance to provide a visual indication (via the second graphical user interface) that the previously-conducted interface variation experiment is associated with an increase in the selected goal for user interaction. In other cases, upon determining that the first portion of the high density interval is equal to zero (e.g., the entire high density interval is less than the control percentage), the method can advance to provide a visual indication (via the second graphical user interface) that the previously-conducted interface variation experiment is associated with an decrease in the selected goal for user interaction. In still other cases, the method may determine that both the first portion and the second portion are non-zero (e.g., the high density interval overlaps the control percentage). In these examples, the method can advance to provide a visual indication (via the second graphical user interface) that the previously-conducted interface variation experiment may be associated with an increase or a decrease in the selected goal for user interaction. The visual indication(s) referenced above and with respect to other embodiment described herein can include, without limitation, an operation of changing a color displayed in the second graphical user interface (e.g., a background, a font color, a border color, and so on), changing a size of an element displayed in the second graphical user interface, or displaying a notification in the second graphical user interface.

Further embodiments can include a determination in which a method advances to determine a precision of an experiment posterior distribution by calculating a width of a high density interval of that experiment posterior distribution. Some embodiments further include the operation of displaying the determined precision. In some cases, another visual indication can be provided in response to a determination that the determined precision satisfies a threshold precision.

Still further embodiments described herein relate to a system for conducting interaction analysis of a first graphical user interface from a second graphical user interface. Such systems include a host device with a processor. The system further includes a first client device (in communication with, or otherwise operably coupled to, the host device) and configured to generate the first graphical user interface. In addition, the system includes a second client device (in communication with, or otherwise operably coupled to, the host device) and configured to generate a second graphical user interface. The second graphical user interface displays (1) a set of goals for user interaction with the first graphical user interface and (2) a set of variations of the first graphical user interface. The system further includes a user interaction history database communicably coupled to processor of the host device. The user interaction history database is configured to store data corresponding to user interaction events triggered when a user interacts with the first graphical user interface. The system further includes a query string database communicably coupled to the processor of the host device. In these embodiments, the processor of the host device can be configure to, without limitation: receive, from the second client device (1) a goal identifier corresponding to a goal selected from the set of goals and (2) a variation identifier corresponding to a variation selected from the set of variations; obtain a dataset constructor query by submitting the goal identifier and the variation identifier to the query string database; obtain a control dataset by querying the user interaction history database with the dataset constructor query, the control dataset filtered to comprise only interaction data of users not presented the selected variation; obtain a variation dataset by querying the user interaction history database with the dataset constructor query, the experiment dataset filtered to comprise only interaction data of users presented the selected variation; determine, from the control dataset, a control percentage of users not presented the selected variation that achieved the selected goal; determine a high density interval of a posterior distribution based on the variation dataset; and instruct the second graphical user interface to display the high density interval juxtaposing the control percentage. In these embodiments, the second graphical user interface can be optionally configured to provide a visual indication upon determining that the high density interval does not overlap the control percentage.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for optimizing user interfaces by automatically (1) generating Bayesian testable datasets from existing user interaction databases, (2) analyzing the testable datasets (e.g., via Bayesian A/B test analysis) for evidence of a positive, neutral, or negative relationship between a given user interface variation and a user interaction goal, and (3) presenting the evidence to a user interface designer in a graphical user interface in a consumable and actionable manner.

As used herein, the term "user interface" refers to, without limitation, any visual, graphical, or other sensory (e.g., tactile, audible, and so on) output of an electronic device to provide output to, and/or receive input from, a user of that electronic device. Examples include, but are not limited to: graphical user interfaces (e.g., two dimensional, three dimensional, virtual reality devices, and so on); voice interfaces; touch interfaces (e.g., trackpads, touch screens, force input sensors); peripheral input devices (e.g., keyboards, mice, stylus devices, and so on). For simplicity of description, the embodiments that follow reference a graphical user interface as an example of a user interface, such as described herein, however, it may be appreciated that other user interfaces may be optimized and/or tested using the systems and methods described herein. Herein, the phrases "graphical user interface" and "user interface" are understood to be synonymous.

For further simplicity of description and illustration, the embodiments that follow reference a collaborative work tool and an issue tracking system as discrete examples of software and/or hardware products that can include a graphical user interface, such as described herein. Other examples of software or hardware products that can include a graphical user interface that can be optimized and/or tested by techniques, methods, and systems described herein include: desktop computing devices; laptop computing devices; portable computing devices (e.g., tablet computers, cellular phones, wearable devices); operating system products; software application products; server application products; containerized micro-service products; server management products; home automation products; industrial control interface products; firmware products; game or entertainment products; and so on.

A "collaborative work tool," including an example user interface that can be optimized and/or tested with techniques and methods described herein, is a project management tool and/or service that can be implemented in whole or in part as software executed by a virtual or physical server or other computing appliance that provides one or more graphical user interfaces to provide a team of individuals with a means for communicating and exchanging information with one another. The graphical user interface(s) of a collaborative work tool, such as described herein, can be accessed in a number of suitable ways include, but not limited to: by end-user device native applications; across the open Internet or a closed intranet by a web browser application, a secure shell, a third party application, and/or a private or public application programming interface; by a dedicated access terminal; and so on. For simplicity of description, collaborative work tools are described herein in reference to a single "graphical user interface" but it may be appreciated that this is merely one example and that many collaborative work tools can include many separate and/or discrete graphical user interfaces.

In some examples, a graphical user interface of a collaborative work tool is configured for use by a software development team to exchange information that can facilitate the completion and assignment of discrete tasks related to software development projects from creation of new user stories (i.e., user-perspective feature requests or desired functionality), through proof of concept testing, through integration testing, through release of software to one or more users, and through reporting and fixing of software errors ("bugs").

In other cases, a collaborative work tool can be configured for non-software related purposes, such as for use by a human resources team, an information technology support group, and so on. It may be appreciated that a graphical user interface of a collaborative work tool, such as described herein can be used to exchange files or information, facilitate text, audio, or video communication, or any other suitable collaboration or communication purpose. In this manner, a collaborative work tool increases efficiency of a team of individuals working on a common goal or project by increasing the speed and efficiency by which information is shared between team members.

An "issue tracking system," including an example user interface that can be optimized and/or tested with techniques and methods described herein, is one example of a collaborative work tool, such as described herein. More specifically, an issue tracking system is project management tool that provides a team of individuals with a common user interface for documenting, tracking, and monitoring completion of work as discrete items of work or tasks related to completion, development, or maintenance of a defined project or goal. An issue tracking system can increase efficiency of a team of software developers working on a common goal or project by facilitating organization of assignment of discrete items of work to an individual or team of individuals most suited to perform that work. More particularly, each item of work tracked by an issue tracking system can be referred to as an "issue" that is typically assigned to a single individual to complete. Example "issues" can relate to, without limitation: a task to identify the cause of a software bug; a task to perform a feasibility assessment for implementation of a new feature; a task to fix an identified software bug; information identifying a software bug; and so on. For purposes of the following disclosure, the terms "issue report," "issue," and "ticket" may be used to generally refer to an issue or item that is being tracked and/or stored by an issue tracking system. The term "issue request" is generally used to describe input provided by a user to an issue tracking system that may result in a creation of an "issue record" in a database by that system.

As noted above, embodiments described herein reference systems and methods optimizing user interface (such as those presented by a collaborative work tool or an issue tracking system) by automatically (1) generating statistically testable datasets from existing user interaction databases, (2) analyzing the testable datasets (e.g., via Bayesian analysis) for evidence of a positive, neutral, or negative relationship between a given user interface variation and a user interaction goal, and (3) presenting the evidence to a user interface designer in another graphical user interface in a consumable and/or actionable manner.

More specifically, embodiments described herein include a server or service (referred to herein as a "host service") that is communicably coupled to two or more databases. A first database, referred to herein in many embodiments as a "user interaction history database," stores data and/or other information (in tables, rows, or any other appropriate organization or structure) that corresponds to user interaction events with a given user interface or user interface element. Example user interaction events that can be stored by the user interaction history database can time-stamped and/or chronologically indexed and may or may not be associated with a particular user (e.g., records may be anonymized in some examples). Example user interaction events can include, but are not limited to: a duration spent by a user on a particular user interface page ("dwell time"); a selection interaction (e.g., touch, click, force input, keyboard action, and so on) by a user to a particular user interface element (e.g., button, scroll area, slider, media, advertisement, and so on); an input interaction by a user (e.g., providing text or other input); a system-level action taken by a user (e.g., joined a mailing list, created an account, advanced to a particular portion of a graphical user interface); moving an input selector (e.g., mouse cursor) in a particular manner or direction; and so on. It may be appreciated that the foregoing examples are not exhaustive; any suitable interaction event can be recorded in any suitable form or format in the user interaction history database.

The user interaction history database can also store information related to previously-conducted A/B tests. The term "A/B test," as used herein refers to a user interface design experimentation method in which users of a particular graphical user interface in a particular time interval are randomly assigned to two or more cohorts or groups. The various groups/cohorts of users are presented with slightly different graphical user interfaces (herein, graphical user interface "variants"). Conventionally, only a single variant of a graphical user interface is tested at a time, although this is not required. More specifically, a first cohort is presented with a control graphical user interface and a second cohort is presented with a variant graphical user interface that is different from the control graphical user interface. While the A/B test is running, data indicating achievement of a particular user interaction "objective" or "goal" desired by a user interface designer (e.g., click a specific button or link, interact with a particular user interface element, create an account, input content, provide other input, dwell on a page for, or less than, a threshold period of time, and so on) is collected and stored in the user interaction history database.

For example, a user interface designer charged with optimizing a graphical user interface of a collaborative work tool may desire to increase the detail or comprehensiveness of input provided by users of the tool, thereby reducing short or uninformative inputs. In this example, the designer may endeavor to conduct an A/B test to determine whether increasing a size of an input box achieves a design goal of increasing the number of words a user inputs to that input box. The user interface designer can construct two interfaces, a control user interface and a variant user interface. The control user interface displays the input box without modification from an original design and the variant user interface displays the input box with increased size. Thereafter, the user interface designer can randomly assign users who access the graphical user interface to a control group or a variant group. The control group is presented the control graphical user interface and the variant group is presented the variant user interface. After a period of time sufficient to collect a statistically-relevant sample size of data, the user interface designer can analyze the data determine whether a statistical inference can be made that users in the variant group input more words to the input box than users of the control group. In this manner, the user interface designer can leverage results of the A/B test to inform design changes to the graphical user interface of the collaborative work tool.

As noted above, embodiments described herein also include a second database communicably coupled to the host service. The second database is referred to herein in many embodiments as a "query database." The query database stores query strings (in tables, rows, or any other appropriate organization or structure) indexed by, or otherwise associated with, specific user interface elements, previously-conducted A/B tests, and/or by particular predefined user interface interaction goals.

The queries stored in the query database (also referred to as "dataset constructor queries") are configured to be submitted to the user interaction history database to obtain Bayesian testable datasets (generated from the user interaction history database) after which a Bayesian A/B test analysis can be automatically performed. For example, queries stored in the query database can be configured to, without limitation: total the number of users who achieved a given user interaction goal during a time period associated with a specific previously-conducted A/B test; total the number of users who did not achieve a given user interaction goal during a time period associated with a specific previously-conducted A/B test; return a percentage or total of users were exposed to a specific interface variant during a time period associated with a specific previously-conducted A/B test; and so on. It may be appreciated that the foregoing examples are not exhaustive; and suitable number of queries and/or query types can be constructed and stored in a query database, such as described herein.

As a result of the query database and the user interaction history database, the host server/service can readily and easily generate Bayesian-testable datasets for both control groups and variant groups of previously-conducted A/B tests after receiving selections from an user interface designer that identify a (1) particular previously-conducted A/B test (and/or an associated user interface variant) and a (2) user interface interaction goal.

Once the Bayesian-testable datasets are obtained, the host server/service can automatically perform a Bayesian analysis of each dataset to determine whether an inference can be drawn that the user interface variant of the selected previously-conducted A/B test resulted in a positive, negative, or neutral change to the user interface interaction goal.

More specifically, the host server/service can be configured to iteratively determine a posterior probability distribution for either or both the testable dataset for the control group (the "control dataset") or the testable dataset for the variant group (the "variant dataset"). In many embodiments, an arbitrary or otherwise uninformative prior distribution can be chosen by the user interface designer (e.g., beta distribution, Gaussian distribution, gamma distribution, beta-binomial distribution, and so on) after which the host server/service can iteratively leverage Bayes Theorem to generate and improve a posterior probability distribution associated with control dataset or the variant dataset. In some cases, the host server/service can be configured to improve the control and/or variant posterior probability distributions by iterating through the control dataset and/or the variant dataset.

In other embodiments, data corresponding to an arbitrary or otherwise uninformative prior distribution type can be stored in the query database or another database. In these embodiments, a prior distribution type can be automatically chosen by the host server/service based on the selections or inputs received from the user interface designer. In other words, the query database can store an association between prior distribution type(s) and a (1) particular previously-conducted A/B test (and/or an associated user interface variant) and a (2) user interface interaction goal. As with other embodiments described herein, the host server/service can thereafter iteratively leverage B ayes Theorem to generate and improve a posterior probability distribution associated with the control dataset or the variant dataset. As noted above, in some cases, the host server/service can be configured to improve the control and/or variant posterior probability distributions by iterating through the control dataset and/or the variant dataset.

Once a variant posterior probability distribution and (optionally) a control posterior probability distribution have been generated by the host server/service, the host server/service can leverage Monte Carlo simulation techniques (e.g., Markov-chain Monte Carlo simulation) to integrate each probability distribution such that statistical characteristics of each distribution (e.g., mode, mean, median, high density interval, and so on) can be readily and easily obtained.

In many embodiments, the host server/service can be configured to automatically extract specific data (or metadata) from the variant posterior probability distribution and the control posterior probability distribution to facilitate a comparison by a user interface designer between the variant distribution and the control distribution.

For example, in many embodiments, the host server/service can be configured to determine a high density interval for the variant distribution and the control distribution based on a predetermined threshold confidence, such as 95% or 99%; these are merely examples and other confidence thresholds may be chosen. The threshold confidence that defines the high density intervals can be stored, in some cases, in the query database. In these examples, the host server/service can be configured to present to the user interface designer the variant high density interval juxtaposed the control high density interval.

In some embodiments, the bounds of the variant high density interval may be reduced by a mode or mean of the control high density interval (e.g., the mode or mean or another descriptive statistic of the control high density interval is subtracted from each of the bounds of the variant high density interval). In still further cases, the host server/service can be configured to automatically determine a width of the variant high density interval and/or the control high density interval.

The foregoing examples are not exhaustive of the data or metadata that can be extracted or generated from a posterior distribution or a variant or control dataset such as described herein. Other examples include, without limitation: a mean of a value set in a dataset; a mode of a posterior distribution; a mean of a posterior distribution; a proportion or portion of a variant high density interval that is greater than a mode or mean of a control high density interval; and so on. Collectively, data or metadata extracted from, or otherwise descriptive of, a posterior distribution or a variant or control dataset are referred to as "descriptive statistics" or "actionable statistics."

Once the host server/service has generated or otherwise obtained an implementation-specific appropriate set of descriptive statistics from the variant posterior probability distribution, the variant dataset, the control dataset, and/or the control posterior probability distribution, the host server/service can communicate those statistics—by any suitable means in any suitable manner (e.g., form or format)—to a graphical user interface presented to the user interface designer, also referred to herein as the "optimization interface."

The optimization interface can be configured display the various descriptive statistics in a manner that "juxtaposes" related descriptive statistics associated with the variant group and descriptive statistics associated with the control group. In other words, in one example, the optimization interface can be configured to display a variant high density interval width adjacent to or otherwise nearby a control high density interval width. The relative proximity of these two related values can facilitate an easy comparison of those values by the user interface designer.

In other cases, the optimization interface can be configured display various descriptive statistics in a manner that highlights certain values that provide evidence to answer the question of whether the user interface variant accomplishes the user interface interaction goal. In other words, in one example, the optimization interface can be configured to display a proportion of the variant high density interval that is greater than a mode or mean of the control posterior probability distribution. If this number is near or equal to 100%, the user interface designer's confidence that the user interface variant accomplishes the user interface interaction goal is high. If this number is near or equal to 50%, the user interface designer's confidence that the user interface variant does not affect the user interface interaction goal in a meaningful way is high. If this number is near or equal to 0%, the user interface designer's confidence that the user interface variant has a negative effect on the user interface interaction goal is high.

In other examples, the optimization interface can display, without limitation: a width of a high density interval of a posterior probability distribution; a difference between a mode or mean (or other descriptive statistic) of a variant posterior probability distribution and a mode of a control posterior probability distribution; a difference between a mode, mean, or other descriptive statistic of a variant posterior probability distribution and an average, total, or percentage of a set of values in a control dataset; and so on. It may be appreciated that these value and/or determined quantities are not exhaustive of the various descriptive statistics that can be shown in an optimization interface, such as described herein.

In still further examples, the optimization interface can be configured to provide one or more visual indications or other sensory outputs (e.g., acoustic, tactile, and so on) to emphasize particular descriptive statistics to a user interface designer. For example, if a particular variant and goal combination result in a variant high density interval that does not overlap and is greater than a mode, mean, or other descriptive statistic of the associated control posterior probability distribution and/or control dataset, the variant high density interval may be emphasized by changing its color in the optimization interface. In one example, the optimization interface can change the color of the variant high density interval to green to indicate to the user interface designer that implementing the variant should accomplish the goal. In an alternative example, if a particular variant and goal combination result in a variant high density interval that does not overlap and is less than a mode, mean, or other descriptive statistic of the associated control posterior probability distribution and/or control dataset, the variant high density interval may be emphasized by changing its color in the optimization interface to red to indicate to the user interface designer that implementing the variant is likely to have a negative effect on the goal. It may be appreciated that visual indications, emphasis, animation, and so on of various descriptive statistics display by the optimization interface may vary from embodiment to embodiment; the preceding examples are not exhaustive.

In view of the foregoing, it may be appreciated that the various constructions and architectures described herein dramatically simplify and automate the process of conducting Bayesian A/B tests without requiring that a user interface designer modify an already-existing database of user interaction events or to retool a testing platform to capture Bayesian-testable statistics. Further, it may be appreciated that the systems and methods described herein can be operated to retroactively rerun previously-conducted A/B tests against new goals.

More generally, as a result of the constructions and architectures described herein, from the perspective of the user interface designer only two inputs need to be provided to the host server/service in order to conduct or re-conduct an A/B test using Bayesian analytics. More specifically, the user interface designer only needs to choose (1) a previously-conducted A/B test (which may be identified by the associated user interface variant) and (2) a user interaction goal in order to perform a Bayesian analysis of the effects of the selected user interface variant on the selected user interaction goal.

In this manner, from the perspective of the user interface designer, once these two selections are made in the optimization interface, relevant and/or actionable statistics are displayed immediately or shortly thereafter, some of which may be emphasized to solicit the attention of the user interface designer.

More specifically, from the perspective of the user interface designer, an instance of the optimization interface may include two catalogs of selectable items. The first catalog of selectable items includes a list of already-conducted A/B tests, each having a descriptive title, that have been conducted for a particular graphical user interface. The second catalog of selectable items includes a list of user interface goals. Once selections are made, in the background and without user intervention, the host server/service accesses the query database to retrieve a set of queries based on the selections provided by the user interface designer, generates a control and variant testable dataset by submitting the set of queries to the user interaction history database, performs Bayesian analytics on the control dataset and/or the variant dataset, and transmits or otherwise communicates one or more descriptive statistics back to the optimization interface for the user interface designer's review.

These foregoing and other embodiments are discussed below with reference to FIGS. 1-4. However, those skilled in the art will readily appreciate that the detailed description given herein with respect to these figures is for explanatory purposes only and should not be construed as limiting.

Figure 1:
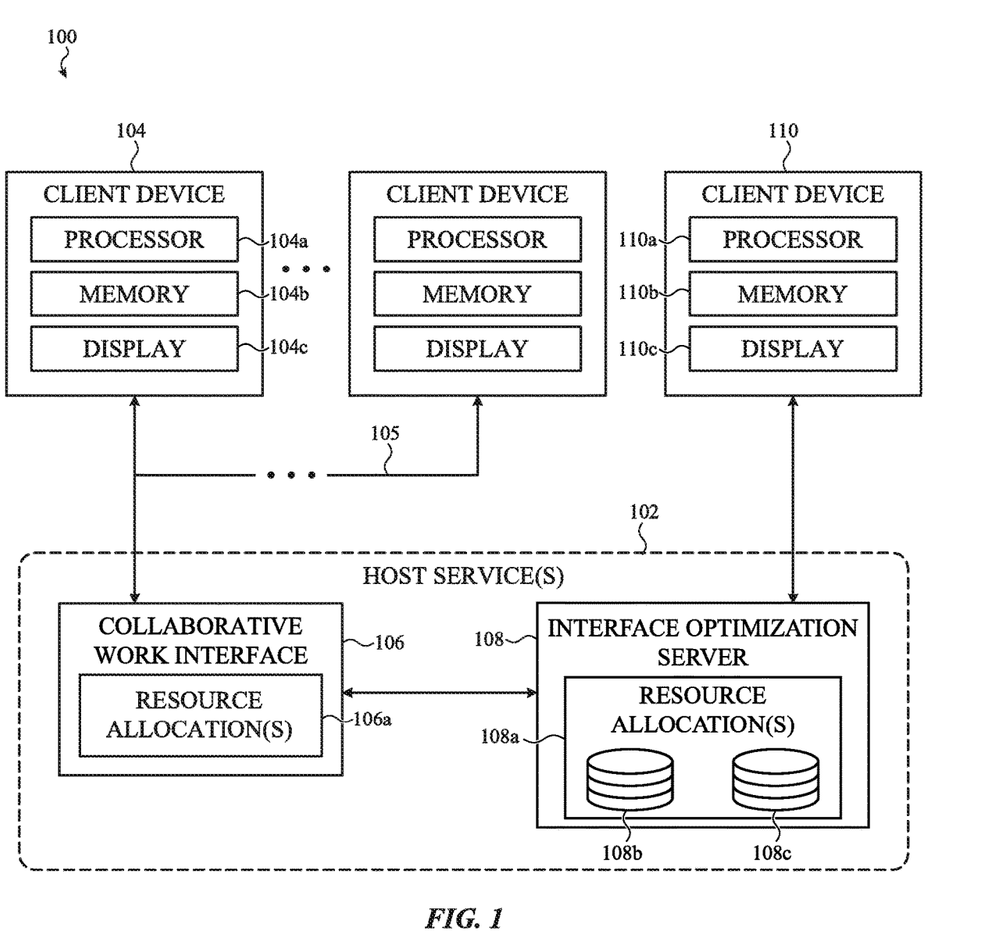
FIG. 1 is a schematic representation of a collaborative work tool associated with a graphical user interface that can be optimized by an interface optimization system, such as described herein.

FIG. 1 is a schematic representation of an example collaborative work tool that can include a graphical user interface displayed by a device operated by a user of the collaborative work tool. The graphical user interface can be optimized by a user interface designer that operates an optimization interface—displayed on the same device or another devices as the graphical user interface optimized by the user interface designer—such as described herein.

As with other embodiments described herein, the optimization interface can be configured to display to the user interface designer one or more descriptive statistics that correspond to one or more properties or characteristics of one or more posterior probability distributions that can be calculated by a host service of the collaborative work tool.

In other cases, the host service that calculates and/or otherwise determines the one or more posterior probability distributions can be separate server or service in communication with the collaborative work tool, but this is not required. For simplicity of description and illustration, the embodiments that follow reference a system for optimization of a user interface of the collaborative work tool that is a portion of the collaborative work tool itself. Initially, the function and operation of the collaborative work tool 100 is described.

In the illustrated embodiment, the collaborative work tool 100 is implemented with a client-server architecture including a host service 102 (also referred to as a "host server") that communicably couples (e.g., via one or more networking or wired or wireless communication protocols) to one or more client devices, one of which is identified as the client device 104. It may be appreciated that other client devices may be configured in a substantially similar manner as the client device 104, although this may not be required of all embodiments and different client devices can be configured differently and/or may transact data or information with, and/or provide input(s) to, the host service 102 in a unique or device-specific manner.

The client device 104 can be any suitable personal or commercial electronic device and may include, without limitation or express requirement, a processor 104a, volatile or non-volatile memory (identified, collectively, as the memory 104b), and a display 104c. Example electronic devices include, but are not limited to: laptop computers; desktop computers; cellular phones; tablet computing devices; and so on. It may be appreciated that a client device 104, such as described herein, can be implemented in any suitable manner.

In many embodiments, the processor 104a of the client device 104 can be configured to execute an application (herein referred to as a "client application") stored, at least in part, in the memory 104b. The client application is configured to access and communicate with the host service 102 and to securely transact information or data with, and provide input(s) to, the host service 102. In addition, the client application is configured to generate, render, or otherwise display a user interface to a user of the client device 104. The user interface can be organized or displayed in any suitable manner and can include any number of discrete user interface elements. Examples include, but are not limited to: buttons; text input areas; attachment upload areas; scrollable areas; content display areas; media items; scroll wheels; and so on. It may be appreciated that the foregoing examples are not exhaustive.

In some embodiments, the client application may be a browser application configured to access a web page or service hosted by the host service 102 that is accessible to the client device 104 over a private or public network that may, in some embodiments, include the open internet.

In many embodiments, the host service 102 is configured to operate within or as a virtual computing environment that is supported by one or more physical servers including one or more hardware resources such as, but not limited to (or requiring) one or more of: a processor; a memory; non-volatile storage; networking connections; and the like. For simplicity of description and illustration, these example hardware resources are not shown in FIG. 1.

In many embodiments, the host service 102 can include a number of discrete subservices or purpose-configured modules, containers, or virtual machines each configured to perform, coordinate, serve, or otherwise provide one or more services, functions, or operations of the host service 102. For example, the host service 102 can include a collaborative work interface server 106 configured to receive inputs provided by users of one or more client devices communicably coupled to the host service 102 (e.g., from the client device 104) via the network 105.

Additionally, as noted above, the collaborative work tool 100—and in particular the host service 102 of the collaborative work tool 100—can be configured to automatically perform Bayesian A/B test analysis in response to an input provided by a user interface designer.

More specifically, in many embodiments, the host service 102 includes an interface optimization service 108 that is communicably coupled to a client device 110 that, like other client devices described herein can include a processor 110a, a memory 110b, and a display 110c that is configured render or otherwise display a graphical user interface to exchange data with the interface optimization server 108. As noted above, the graphical user interface rendered by the client device 110 is referred to herein as the "optimization interface."

In the illustrated embodiment, the interface optimization service 108 is in communication with two separate databases. A user interaction history database 108b stores data and/or other information that corresponds to user interaction events with a given user interface or user interface element presented by the host service 102 to a client device, such as the client device 104. Example user interaction events are provided above and are not repeated.

The interface optimization server 108 also includes and/or is communicably coupled to a query database 108c. The query database 108c stores query strings (in tables, rows, or any other appropriate organization or structure) indexed by, or otherwise associated with, specific user interface elements, previously-conducted A/B tests, and/or by particular predefined user interface interaction goals. Example user queries are provided above and are not repeated.

As noted with respect to other embodiments described herein, the user interaction history database 108b can also store user interaction information related to previously-conducted A/B tests. Similarly, as noted with respect to other embodiments described herein, the queries stored in the query database 108c are configured to be submitted to the user interaction history database 108b to obtain Bayesian testable datasets (generated from the user interaction history database 108b) after which a Bayesian A/B test analysis can be automatically performed by a processor of the interface optimization server 108.

More specifically, as a result of the query database 108c storing queries (some of which may be modified and/or filtered by the interface optimization server 108) to access and reformat data from the user interaction history database 108b, the host service 102 and in particular the interface optimization server 108—can readily and easily generate Bayesian-testable datasets for both control groups and variant groups of previously-conducted A/B tests after receiving selections from the user interface designer via the optimization interface that identify a (1) particular previously-conducted A/B test (and/or an associated user interface variant) and a (2) user interface interaction goal.

Once the Bayesian-testable datasets are obtained, the interface optimization server 108 can automatically perform a Bayesian analysis of each dataset to determine whether an inference can be drawn that the user interface variant of the selected previously-conducted A/B test resulted in a positive, negative, or neutral change to the user interface interaction goal.

More specifically, as noted above, the interface optimization server 108 of the host service 102 can be configured to iteratively determine a posterior probability distribution for either or both the control dataset or the variant dataset. In many embodiments, data corresponding to an arbitrary/uninformative prior distribution type can be stored in the query database 108c or another database accessible to the interface optimization server 108.

In these embodiments, and as noted above, a prior distribution type can be automatically chosen by the interface optimization server 108 based on the selections or inputs received from the user interface designer. For example, if the user interface designer requests via the optimization interface shown by the client device 110 to conduct a Bayesian analysis of a given variant relative to a binary goal (e.g., a user clicks or does not click), the interface optimization server 108 may select a beta-binomial distribution type as the uninformative prior distribution. Alternatively, if the user interface designer requests via the optimization interface shown by the client device 110 to conduct a Bayesian analysis of a given variant relative to a non-binary goal (e.g., decrease a dwell time by a certain amount), the interface optimization server 108 may select a gamma distribution type as the uninformative prior distribution. In other words, as noted above, the query database 108c can store an association between prior distribution type(s) and a (1) particular previously-conducted A/B test (and/or an associated user interface variant) and a (2) user interface interaction goal.

As with other embodiments described herein, the interface optimization server 108 can thereafter iteratively leverage Bayes Theorem to generate and improve a posterior probability distribution associated with the control dataset or the variant dataset. As noted above, in some cases, the interface optimization server 108 can be configured to improve the control and/or variant posterior probability distributions by iterating through the control dataset and/or the variant dataset.

Once a variant posterior probability distribution and (optionally) a control posterior probability distribution have been generated by the host service 102, the host service 102 can leverage Monte Carlo simulation techniques to integrate each probability distribution such that statistical characteristics of each distribution (e.g., mode, mean, median, high density interval, and so on) can be readily and easily obtained.

Thereafter, the interface optimization server 108 can automatically extract specific data (or metadata)—referred to herein as descriptive statistics or, more generally, "evidence" of a statistically relevant relationship between the variant and the goal—from the variant posterior probability distribution and/or the control posterior probability distribution to facilitate a comparison by the user interface designer via the optimization interface displayed by the client device 110. Example descriptive statistics are provided above and are not repeated here.

Once the interface optimization server 108 has generated or otherwise obtained an implementation-specific appropriate set of descriptive statistics from the variant posterior probability distribution, the variant dataset, the control dataset, and/or the control posterior probability distribution, the interface optimization server 108 can communicate those statistics—by any suitable means in any suitable manner (e.g., form or format)—to the client device 110 to display to the user interface designer via the optimization interface.

As noted above, the optimization interface can be configured display the various descriptive statistics in a manner that "juxtaposes" (i.e., positions physically proximate to one another so as to visually emphasize differences and/or contrast two values) related descriptive statistics associated with the variant group and descriptive statistics associated with the control group. In other words, in one example, the optimization interface can be configured to display a variant high density interval width adjacent to or otherwise nearby a control high density interval width. The relative proximity of these two related values can facilitate an easy comparison of those values by the user interface designer. In other cases, a tabular format may be used.

In some embodiments, the optimization interface can be configured display various descriptive statistics in a manner that visually emphasizes certain values that satisfy predetermined thresholds (which may be unique to a specific value type).

In other words, in one example, the optimization interface can be configured to display a proportion of the variant high density interval that is greater than a mode, mean, or other descriptive statistic of the control posterior probability distribution. If this number is near or equal to 100% (e.g., exceeding a threshold such as 70%), the interface optimization server 108 can instruct the optimization interface to color the value green to indicate to the user interface designer that the interface optimization server 108 has high confidence that the variant is more likely to achieve the goal than the control. Alternatively, if this number is near or equal to 50% (e.g., between threshold values of 30% and 70%), the interface optimization server 108 may dim or hide the value to indicate to the user interface designer that the interface optimization server 108 has a high confidence that the variant has no effect on the goal. Additionally, if this number is near or equal to 0% (e.g., lower than a threshold of 30%), the interface optimization server 108 can shade the value red to indicate to the user interface designer that the interface optimization server 108 has a high confidence that the variant has a negative effect on achievement of the goal.

The optimization interface, optionally in response to one or more instructions from the interface optimization server 108, can be configured to provide one or more visual indications or other sensory outputs (e.g., acoustic outputs, tactile outputs, and so on) to emphasize particular descriptive statistics that satisfy particular thresholds to a user interface designer. It may be appreciated that different thresholds can be set for different values and different value ranges and may vary from implementation to implementation and embodiment to embodiment. Thus, more generally and broadly, it is appreciated that an interface optimization server, such as described herein can be configured to visually emphasize values that are strongly indicative of positive, neutral, or negative relationships to a selected goa.

In view of the foregoing, and as noted above, it may be appreciated that the various constructions and architectures described herein dramatically simplify and automate the process of conducting Bayesian A/B tests without requiring that a user interface designer modify an already-existing database of user interaction events or to retool a testing platform to capture Bayesian-testable statistics. Further, it may be appreciated that the systems and methods described herein can be operated to retroactively rerun previously-conducted A/B tests against new goals.

Accordingly, it is appreciated that the foregoing embodiment depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

For example, the collaborative work tool 100 of FIG. 1 can be implemented in a number of suitable ways. As illustrated, the host service 102 includes one or more purpose-configured modules or components each configured to perform a discrete task associated with the operation of the collaborative work tool 100.

In particular, as noted above, the host service 102 includes a collaborative work interface server 106 and an interface optimization server 108. It may be appreciated that although these functional elements are identified as separate and distinct "servers" that each include allocations of physical or virtual resources (identified in the figure as the resource allocations 106a and 108a, respectively)—such as one or more processors, memory, and/or communication modules (e.g., network connections and the like)—that such an implementation is not required. More generally, it may be appreciated that the various functions described herein of a host service 102 can be performed by any suitable physical hardware, virtual machine, containerized machine, or any combination thereof.

Figure 2A:
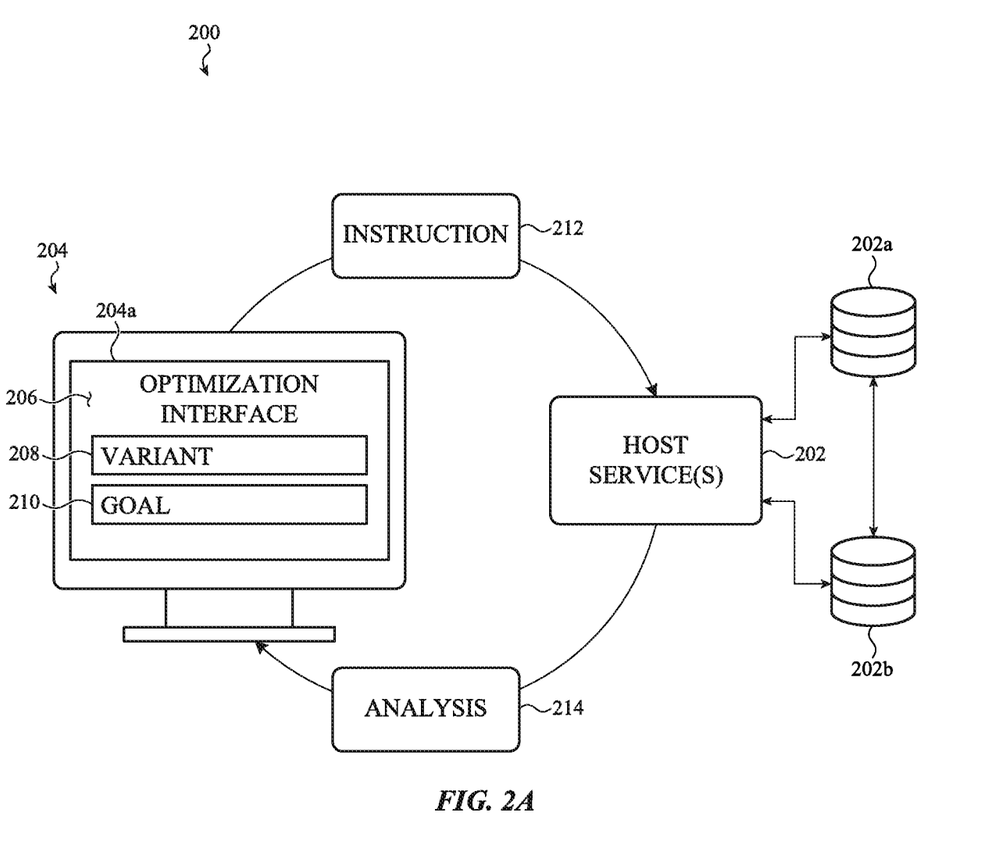
FIG. 2A is a system and process flow diagram of an interface optimization system, such as described herein.

FIG. 2A depicts an example signal flow diagram depicting communications between a client application rendering an optimization interface and operating on a client device and an interface optimization server of a host service associated with a collaborative work tool, such as described herein. More specifically, as with the embodiment depicted in FIG. 1, the collaborative work tool 200 includes a host service 202 in communication with a client device 204.

The client device 204 can execute an instance of a client application 204a that can be configured to access an interface optimization server of the collaborative work tool 200. The client application 204a can render an optimization interface 206.

The optimization interface 206 can be used by a user interface designer to submit one or more inputs provided to the host service 202. More specifically, the optimization interface 206 can render one or more data entry fields, such as the data entry fields 208, 210 illustrated in the figure, that can receive data entered by a user interface designer.

In one specific implementation of this example embodiment, a user interface designer can operate the optimization interface 206 of the client application 204a to enter data into either or both of the data entry fields 208, 210 to generate an instruction 212—which can include a first and second data item, each associated with an entry to one of the data entry fields 208, 210. More specifically, a first data item can be associated with a selection by the user interface designer of a previously-conducted A/B test (which may be identified with reference to the variant under test in that A/B test) and a second data item can be associated with a selection by the user interface designer of a goal to test. In some embodiments, more than one goal and more than one variant can be included in the instruction 212.

In response to receiving the instruction 212, the host service 202—or, more precisely, an interface optimization server or service of the host service 202 (see, e.g., FIG. 1)—can perform one or more operations. For example, the interface optimization server can access a query database 202a by submitting a request thereto with either or both the first and second data items of the instruction 212. Thereafter, the interface optimization server of the host service 202 can receive from the query database 202a a set or series of queries associated with the variant or A/B test and goal selected by the user interface designer. In some cases, the interface optimization server of the host service 202 can be configured to modify the queries retrieved from the query database 202a; in these embodiments the set of queries obtained from the query database can be referred to as "base queries" that are modified and/or otherwise filtered based on one or more data items of the instruction 212.

Thereafter, the interface optimization server of the host service 202 can be configured to query a user interaction history database 202b with the set of queries obtained from the query database 202a. As noted with respect to other embodiments described herein, the interface optimization server of the host service 202 obtains a first and second dataset from the user interaction history database 202b; the first and second datasets are Bayesian-testable datasets containing information based on the instruction 212. A first dataset is referred to as a control dataset and a second dataset is referred to as a variant dataset.

With the control and variant datasets, the interface optimization server of the host service 202 can be configured to generate and/or improve two posterior probability distributions by leveraging Bayes theorem. As noted above, any suitable priors may be chosen; in some embodiments the query database 202a and/or the user interaction history database 202a can store a preferred prior or prior distribution type for a given variant, goal, variant type, or goal type.

With a control and variant posterior probability distribution, the interface optimization server of the host service 202 can generate one or more descriptive statistics such as described herein. Thereafter, the interface optimization server of the host service 202 can communicate the descriptive statistics back to the optimization interface 206 as an analysis message 214.

Figure 2B:
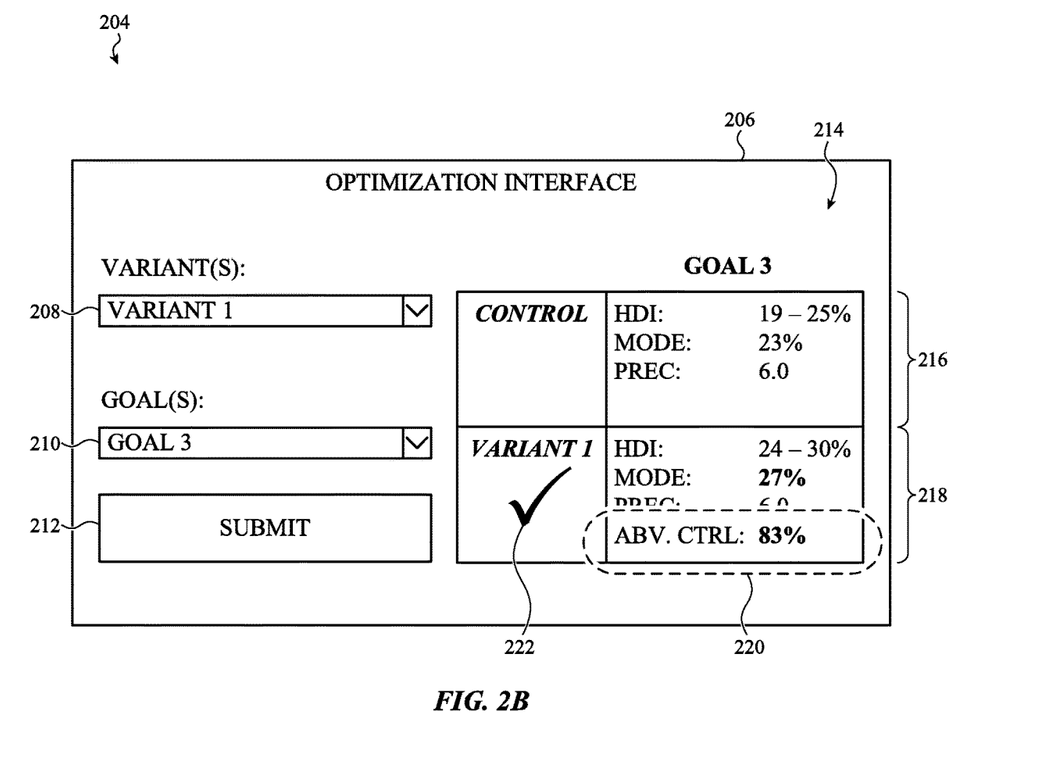
FIG. 2B depicts an example optimization interface, such as described herein.

Once the analysis message 214 is received by the client device 204 the optimization interface 206 display descriptive statistics contained therein in any suitable manner to facilitate quick and efficient consumption by the user interface designer. For example, FIG. 2B depicts one example implementation of the optimization interface 206 of FIG. 2A. In this example embodiment, the analysis message 214 can be displayed in a tabular form. In the illustrated embodiment, descriptive statistics related to the control group are shown in a first row 216 and descriptive statistics related to the variant group are shown in a second row 218. In this example, a high density interval, a mode or mean, and a precision metric (which corresponds to a width of the high density interval) are shown for both the control and variant group. In addition, the optimization interface 206 includes two visual indications, identified as the visual indications 220, 222 that highlight for the user interface designer that the variant has a positive effect on the goal. It may be appreciated that the visual indications 220, 222 are merely examples and are not exhaustive of the various visual indications or emphasis that can be provided by the optimization interface 206.

The foregoing embodiments depicted in FIGS. 1-2C and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Figure 3:
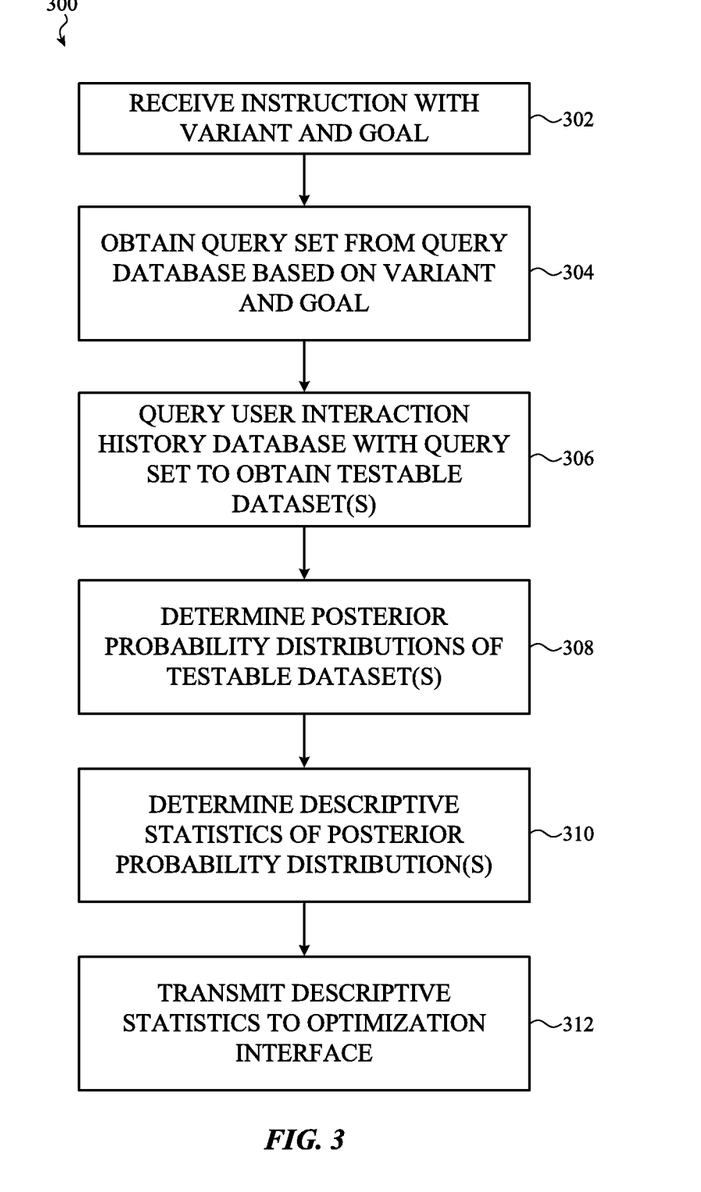
FIG. 3 is a flow chart depicting example operations of a method of operating an interface optimization system, such as described herein.

FIG. 3 is a flow chart depicting example operations of a method of operating an interface optimization system, such as described herein. The method 300 can be performed by any suitable hardware or software combination and may be performed in whole or in part by a host service, such as described herein. In many examples, the method 300 can be performed in whole or in part by a graphical user interface operated by a user interface designer that is rendered on a client device communicably coupled to a host service, such as described herein.

The method 300 includes operation 302 in which an instruction including a variant identifier and a goal identifier is received. (see, e.g., FIGS. 2A-2B). As noted with respect to other embodiments described herein, a variant identifier and a goal identifier can be received in any suitable form or format. In certain embodiments, the identifiers are stored in a Javascript object notation compliant string or object. In some examples, the variant identifier can be, without limitation: a string identifying a previously-conducted A/B test; a string identifying a user interface variant; a string identifying metadata associated with a previously-conducted A/B test, an interface variant, a user interface, a user interface designer, and so on; and so on. In some examples, the goal identifier can be, without limitation: a binary goal (a user clicks through); a percentage goal (a percentage of users who click through); a combination goal (a user clicks through and creates an account); and so on.

Next, at operation 304, a query set corresponding to one or both of the variant identifier or the goal identifier is obtained by querying a query database. As noted above, the database can be a single database, a set of databases, or a series of interlinked databases, tables, and/or other data storage systems.

Next, at operation 306, a user interaction history database is queried with one or more queries of the set of queries obtained at operation 304. The queries may be modified or filtered based on the variant identifier and/or the goal identifier received at operation 302. After submitting the queries to the user interaction history database, the method obtains one or more Bayesian testable datasets.

Next, at operation 308, the method determines posterior probability distributions based on the one or more Bayesian testable datasets obtained at operation 306. Next, at operation 310, one or more descriptive statistics can be determined from the posterior probability distributions obtained at operation 308. In some cases, an integral (e.g., via Monte Carlo simulation) of the posterior probability distributions may be required in order to generate one or more descriptive statistics. Finally, at operation 312, the descriptive statistics may be transmitted to an optimization interface, such as described herein.

Figure 4:
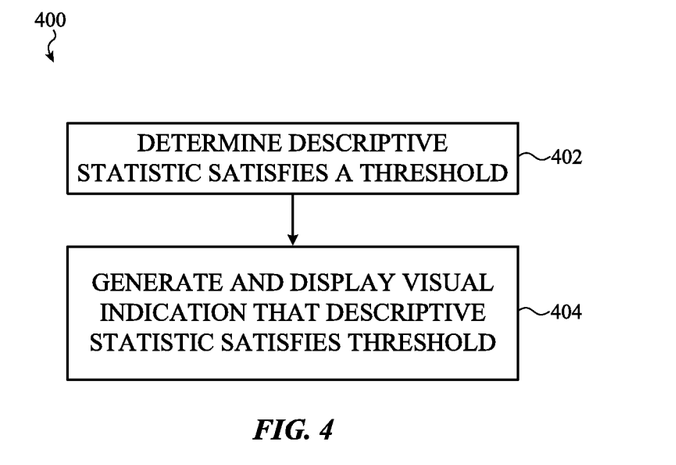
FIG. 4 is a flow chart depicting example operations of a method of operating an interface optimization system, such as described herein.

FIG. 4 is a flow chart depicting example operations of a method of operating an interface optimization system, such as described herein. The method 400 includes the operation 402 in which it is determined whether a given descriptive statistic satisfies a threshold. The threshold may be stored in and/or retrieved from a database in communication with the interface optimization system. The method 400 further includes operation 404 in which a visual indication (e.g., notification, font change, color change, animation, and so on) is generated in an optimization interface to highlight or otherwise emphasize the descriptive statistic.

It is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Accordingly, one may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A method for generating a graphical user interface for interface design and testing, the graphical user interface generated and rendered at a client device communicably coupled to a host service, the method comprising:
receiving, from the client device at the host service, an instruction comprising a selection from each of first and second user interface elements rendered in the graphical user interface at the client device, the instruction comprising:
first identifying information corresponding to a selection, from the first user interface element, of a testable interaction objective from a list of testable interaction objectives rendered in the first user interface element; and
second identifying information corresponding to a selection, from the second user interface element, of an already-tested user interface variation associated with an already-completed A/B test, the already-tested user interface variation selected from a list of already-tested user interface variations each associated with a respective one already-completed A/B test;
obtaining a control dataset from a user interaction database communicably coupled to the host service, the control dataset comprising first interaction data captured from users that were presented with a control user interface during the already-completed A/B test;
obtaining a variant dataset from the user interaction database, the variant dataset comprising second interaction data captured from users that were presented with a variant user interface during the already-completed A/B test;
determining a control posterior distribution from the control dataset;
determining a variant posterior distribution from the variant dataset;
determining a probability that the testable interaction objective is more likely to be achieved under the variant posterior distribution than the control posterior distribution; and
signaling the client device to cause the graphical user interface to display the determined probability with the first and second user interface elements.

2. The method of claim 1, wherein:
the user interaction database is a first user interaction database; and
obtaining the control dataset from the first user interaction database comprises:
obtaining a base set of query strings by submitting the first identifying information as a query to a second user interaction database communicably coupled to the host service;
generating a control set of query strings by modifying each query string of the base set of query strings to only match data not associated with the already-tested user interface variation; and
submitting each query string of the control set of query strings to the first user interaction database to generate the control dataset.

3. The method of claim 2, wherein obtaining the variant dataset from the first user interaction database comprises:
generating a variant set of query strings by modifying each query string of the base set of query strings to only match data associated with the already-tested user interface variation; and
submitting each query string of the variant set of query strings to the first user interaction database to generate the variant dataset.

4. The method of claim 1, wherein:
the user interaction database is a first user interaction database; and
obtaining the control dataset from the first user interaction database comprises:
obtaining a set of query strings by submitting the first identifying information as a query to a second user interaction database communicably coupled to the host service;
submitting each query string of the set of query strings to the first user interaction database to generate a base dataset; and
generating the control dataset by filtering the base dataset to only match data not associated with the already-tested user interface variation.

5. The method of claim 4, wherein obtaining the variant dataset from the first user interaction database comprises generating the variant dataset by filtering the base dataset to only match data associated with the already-tested user interface variation.

6. The method of claim 1, further comprising selecting a prior distribution type based on the testable interaction objective.

7. The method of claim 6, wherein:
the control posterior distribution is based on the selected prior distribution type and the control dataset;
the variant posterior distribution is based on the selected prior distribution type and the variant dataset.

8. The method of claim 1, wherein determining the probability that the testable interaction objective is more likely to be achieved under the variant posterior distribution than the control posterior distribution comprises a Monte Carlo integration operation for each of the control posterior distribution and the variant posterior distribution.

9. A method for optimizing a first graphical user interface presented by a client device communicably coupled to a host device, the method comprising:
receiving first identifying information corresponding to a testable user interaction objective corresponding to a selected goal for user interaction with the first graphical user interface;
receiving second identifying information corresponding to an already-tested user interface variation of the first graphical user interface, the already-tested user interface variation associated with an already-completed A/B test;
obtaining a dataset constructor query by submitting the first identifying information and the second identifying information to a query string database;
obtaining a control dataset by querying a user interaction history database with the dataset constructor query;
obtaining an experiment dataset by querying the user interaction history database with the dataset constructor query;
extracting control dataset metadata from the control dataset, the control dataset metadata comprising a control percentage of users that satisfied the testable user interaction objective and that were not presented with the already-tested user interface variation;
determining an experiment posterior distribution from the experiment dataset;
extracting experiment metadata from the experiment posterior distribution, the experiment metadata comprising a high density interval based on a predefined uncertainty threshold; and
displaying, at a second graphical user interface rendered at the client device:
the high density interval juxtaposing the control percentage;
a first user interface element listing a set of other testable user interaction objectives different from the testable user interaction objective; and
a second user interface element listing a set of other already-completed A/B tests, each associated with at least a respective one already-tested user interface variation.

10. The method of claim 9, wherein:
the high density interval is an experiment high density interval; and
the method further comprises:
determining a first portion of the experiment high density interval that is greater than a control high density interval based on the control dataset;
determining a second portion of the experiment high density interval that is less than the control high density interval; and
displaying, at the second graphical user interface, at least one of the first or second portions of the experiment high density interval.

11. The method of claim 10, further comprising determining whether the first or second portion of the experiment high density interval is equal to zero.

12. The method of claim 11, wherein upon determining that the second portion of the experiment high density interval is equal to zero, providing a visual indication via the second graphical user interface that the already-completed A/B test is associated with an increase in the testable user interaction objective.

13. The method of claim 12, wherein the visual indication comprises one or more of:
changing a color displayed in the second graphical user interface;
changing a size of an element displayed in the second graphical user interface;
or
displaying a notification in the second graphical user interface.

14. The method of claim 11, wherein upon determining that the first portion of the experiment high density interval is equal to zero, providing a visual indication via the second graphical user interface that the already-completed A/B test is associated with a decrease in the testable user interaction objective.

15. The method of claim 11, further comprising determining a precision of the experiment posterior distribution by calculating a width of the experiment high density interval.

16. The method of claim 15, further comprising: displaying the precision in the second graphical user interface; and
providing a visual indication, via the second graphical user interface, in response to a determination that the precision satisfies a threshold precision.

17. A system for conducting interaction analysis of a first graphical user interface from a second graphical user interface by leveraging one or more already-completed A/B tests and user interaction data captured from users of the first graphical user interface while each respective already-completed A/B test was conducted, the system comprising:
a host device comprising a processor;
a first client device in communication with the host device and configured to generate the first graphical user interface;
a second client device in communication with the host device and configured to generate the second graphical user interface, the second graphical user interface comprising:
a first user interface element comprising a set of testable user interaction objectives with the first graphical user interface; and
a second user interface element comprising a set of already-tested user interface variations of the first graphical user interface, each of the already-tested user interface variations associated with a respective one already-completed A/B test;
a user interaction history database communicably coupled to the processor of the host device and configured to store data corresponding to user interaction events triggered when the users interact with the first graphical user interface; and a query string database communicably coupled to the processor of the host device; wherein the processor of the host device is configure to:

receive, from the second client device:

first identifying information corresponding to a selected testable user interaction objective selected from the first user interface element; and second identifying information corresponding to a selected already-tested user interface variation selected from the second user interface element;

obtain a dataset constructor query by submitting the first identifying information and the second identifying information to the query string database;

obtain a control dataset by querying the user interaction history database with the dataset constructor query, the control dataset filtered to comprise only interaction data of users not presented with the selected already-tested user interface variation;

obtain a variation dataset by:

querying the user interaction history database with the dataset constructor query, the variation dataset filtered to comprise only interaction data of users presented with the selected already-tested user interface variation, wherein the selected already-tested user interface variation was presented during a corresponding already-completed A/B test;

determine from the control dataset, a control percentage of the users not presented with the selected already-tested user interface variation that achieved the selected testable user interaction objective;

determine a high density interval of a posterior distribution based on the variation dataset; and instruct the second graphical user interface to display the high density interval adjacent to the control percentage with the first and second user interface elements.

18. The system of claim 17, wherein the second graphical user interface is configured to provide a visual indication upon determining that the high density interval does not overlap the control percentage.

* * * * *